United States Patent
Piëch

[11] 3,710,884
[45] Jan. 16, 1973

[54] MOTOR VEHICLE, ESPECIALLY PASSENGER MOTOR VEHICLE

[75] Inventor: Ferdinand K. Piëch, Stuttgart-Nord, Germany

[73] Assignee: Firma Dr. - Ing. h.c.F. Porsche K.G., Stuttgart-Zuffenhausen, Germany

[22] Filed: July 8, 1970

[21] Appl. No.: 53,128

[30] Foreign Application Priority Data

July 9, 1969 Germany.................P 19 34 681.7

[52] U.S. Cl. .............................................. 180/54 R
[51] Int. Cl. .............................................. B60k 5/02
[58] Field of Search............180/54, 55, 56, 57, 70, 1, 180/58, 59, 60, 61, 62, 63, 64

[56] References Cited

UNITED STATES PATENTS

| | | | |
|---|---|---|---|
| 2,075,085 | 3/1937 | Paton | 180/54 |
| 2,075,084 | 3/1937 | Best | 180/54 |
| 2,563,981 | 8/1951 | Walker | 180/54 X |
| 2,084,572 | 6/1937 | Breer | 180/69 C X |
| 2,903,083 | 9/1959 | Kelley | 180/1 X |
| 2,168,108 | 8/1939 | Bunau-Varilla | 180/54 |
| 3,021,715 | 2/1962 | DeLorean et al. | 180/70 UX |
| 3,155,187 | 11/1964 | DeLorean | 180/70 P |

*Primary Examiner*—Benjamin Hersh
*Assistant Examiner*—Milton L. Smith
*Attorney*—Craig and Antonelli

[57] ABSTRACT

Motor vehicle, especially passenger motor vehicle, having a multicylinder, in-line engine including a cooling plant arranged ahead or above the non-driven axle, and a change-speed gear interlocked with a differential gear including a clutch as well as the non-driven auxiliary devices such as a battery, fuel tank and spare wheel are arranged above or behind the driven axle. The flywheel and the auxiliary equipment which do not necessarily have to be driven in synchronism with the engine crankshaft are associated with the change-speed gear and drivingly connected with it or the flywheel, respectively.

17 Claims, 2 Drawing Figures

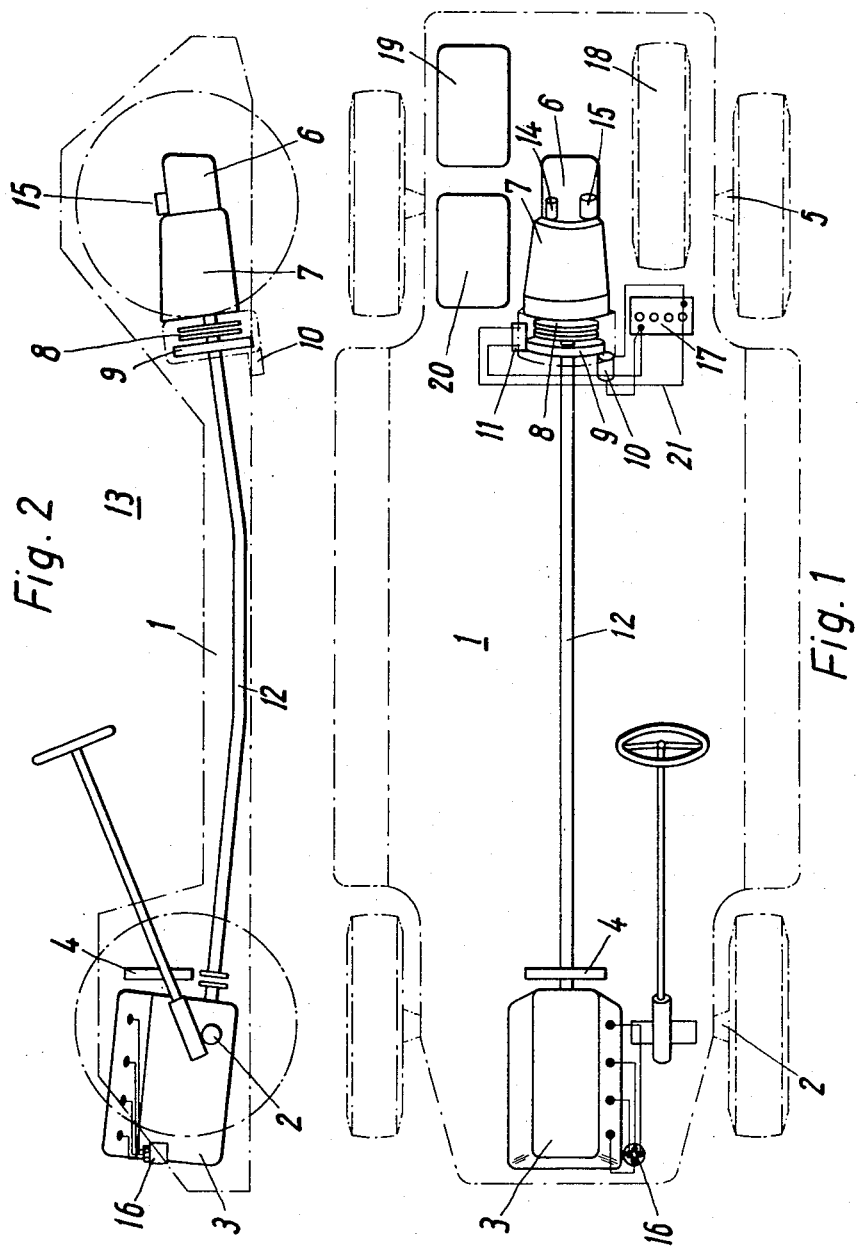

MOTOR VEHICLE, ESPECIALLY PASSENGER MOTOR VEHICLE

BACKGROUND OF THE INVENTION

The present invention relates to a motor vehicle, especially a passenger motor vehicle, and more particularly, to a motor vehicle in which advantageously a multi-cylinder, in-line engine including a cooling plant is arranged ahead or above the non-driven axle and a change-speed gear interlocked with the differential gear including the clutch as well as the non-driven auxiliary devices of the motor vehicle such as battery, fuel tank and spare wheel are arranged above or behind the driven axle.

For a motor vehicle with front wheel drive, the disposition of the drive aggregate or plant assembly is already known as shown in U.S. Pat No. 2,168,108 according to which the engine, including the cooling plant, is arranged above the non-driven axle and the change-speed gear interlocked with the differential gear including clutch is arranged above the driven axle. Inasmuch as this split-up of the driving aggregate or plant in general does not provide for a complete weight balance even when the change-speed gear is very heavy, it has been further suggested according to the above-mentioned U.S. Patent to additionally arrange also the battery and spare wheel ahead or above the non-driven axle. By the use of a modern, relatively light mechanical change-speed gear, on the one hand, and a water-cooled, for example, six cylinder in-line engine, on the other hand, a sufficient weight balance through the above measures alone is no longer possible. Aside from this, the disposition of the battery which is arranged far remotely away from the light generator and the starter involves considerable disadvantages regarding the disposition of the wiring.

SUMMARY OF THE INVENTION

Therefore, the aim of the present invention is to overcome the above-mentioned problems and disadvantages encountered in the prior art arrangements.

In particular, it is an aim of the present invention to create an arrangement of the plant or driving aggregate and non-driven auxiliary equipment of a motor vehicle, which arrangement is installable at a low cost and small effort and which provides for a good weight balance even taking into consideration the difference in weight between the engine or drive motor and the change-speed gear.

Further, the present invention aims at effecting an improvement of the driving characteristics of a motor vehicle through measures for the attainment of a largest possible moment of enertia about the vertical axis of the plane of the vehicle.

The foregoing problems and disadvantages are solved in accordance with the present invention by providing that, for a motor vehicle of the above-mentioned construction (at the start), the flywheel and at least the auxiliary machinery such as the light generator and the starter, which do not necessarily have to be driven in synchronism with the crankshaft of the drive engine, are assigned to the change-speed gear and drivingly connected therewith or with the flywheel, respectively.

An, especially, constructionally favorable development of the present invention results hereby when the light generator and the flywheel of the engine form one structural element. Thus, the light generator, in accordance with the present invention, may be fitted to the starter forming a so-called starter-light machine whereby the first advantage is the attainment of the least number of individual aggregates or assemblies and, further, a simpler assembly and mounting of the entire aggregate or assembly into the motor vehicle.

In contrast to the known constructions of the driving assemblies or aggregates of such motor vehicles, a further advantage is obtained through the present invention by the extremely short light generator and starter cables, which advantage is especially obtained when the battery is arranged laterally adjacent to the light-starter machine. A reduction of a fire hazard also results even with the heaviest damage to the vehicle. A further characteristic of the present invention, aside from the shortening of the heavy current-carrying cables, may be obtained thereby in that, between the current-carrying aggregates or cables and parts or containers with inflammable materials such as the fuel tank, parts or aggregates of basically non-flammable material such as the spare wheel are arranged. The battery and spare wheel may especially be arranged at one side and the fuel and lube oil containers at the other side in each case in line so that, in case of damage to the vehicle, the battery may not be pressed against the fuel tank due to the gearing being located therebetween.

Finally, according to a further characteristic of the present invention, it may also be provided that all remaining aggregates such as, for example, the fuel pump or hydraulic pump for auxiliary drives which do not necessarily have to be driven in synchronism with the crankshaft are assigned to the change-speed gear and flywheel, respectively, of the engine or drive motor and operatively connected with one of these aggregates. As a result, a loading reduction of the non-driven axle simultaneously with the loading of the driven axle is obtained.

By employing the underlying concept of the present invention, that is to assign all auxiliary machines of weights worth mentioning and, especially, the flywheel of the engine to the change-speed gear, a higher loading of the driven axle is obtained whereby, simultaneously, unloading of the non-driven axle is achieved. Furthermore, by combining the auxiliary machinery with the gearing, a structural simplification of the motor vehicle is achieved. In addition, the arrangement of all auxiliary machines of the engine which must not necessarily be driven in synchronism by the crankshaft at the gearing creates a simpler construction of the cylinder block. As a result of the constructional combination of a number of auxiliary machines such as the starter and the light generator in accordance with the present invention, a structural simplification of the entire aggregate or assembly at the side of the gearing is thereby possible.

BRIEF DESCRIPTION OF THE DRAWING

These and further features, aims and objects of the present invention will become more apparent from the following description when taken in conjunction with the accompanying drawing which shows, for purposes of illustration only, an embodiment in accordance with the present invention and wherein:

FIG. 1 is a plan view showing the chassis and driving system of a motor vehicle in accordance with the present invention; and FIG. 2 is a side view of the chassis and driving system shown in FIG. 1.

DETAILED DESCRIPTION OF THE DRAWING

Referring now to the drawing and, in particular, to FIG. 1, there is shown a passenger motor vehicle provided with an essentially flat floor group 1, a six-cylinder, in-line engine 3 including cooling system 4 which is arranged above the non-driven front axle 2 and a change-speed gear 7 including clutch 8 and interlocking at one end thereof with the differential gear 6. The change-speed gear is arranged above the rear axle 5 which is constructed, in this case, as a flexible swing axle.

The flywheel 9 of the engine or drive motor 3, as well as light generator 10 and starter 11 are physically combined with the change-speed gear 7, whereby the light generator 10 and the starter 11 are each operatively connected to the flywheel 9 through known means. The torque of the engine 3 is transmitted to the flywheel 9 through a torsionally elastic shaft 12 whereby, through a slanted arrangement of the engine 3 and the gear blocks 6, 7 and 8 in connection with a small curvature of the torsionally elastic shaft 12, the housing or disposition of shaft 12 below the floor group 1, which is entirely flat at least in the area of the passenger compartment 13, is thereby possible. Through the use of a torsionally elastic shaft 12 for transmitting engine torque, it is further achieved that the vibration node of the engine torsional vibration of a six-cylinder, in-line engine is shifted toward the center of the engine so that the dampers required up to now and arranged at both ends of the engine 3 are no longer required.

Further, a fuel pump 14 for the engine 3 and a hydraulic pump 15 for driving the auxiliary equipment are physically combined with the change-speed gear 7 and are operatively connected thereto. In this manner, the only auxiliary device remaining at the engine 3 is the distributor system 16 which, by necessity, must be driven in synchronism with the crankshaft. Through the combination of these measures and aside from a good weight balance, an entirely flat construction of the cylinder block of the engine is thereby achieved.

At both sides of the gear block 6, 7 and 8, the non-driven auxiliaries of the vehicle such as battery 17, spare wheel 18, fuel tank 19, and lube oil tank 20 are arranged in such a way, that between the cables carrying strong currents such as the light generator or starter cables 21 and the containers containing easily inflammable materials such as the fuel tank 19 and lube oil container 20, parts or aggregates of basically non-flammable materials are placed. In the illustrated embodiment, for example, the fuel tank 19 and the lube oil container 20 are arranged at one side of the gear block 6, 7 and 8, and the battery 17 and the spare wheel 18 are arranged at the other side of the gear block 6, 7 and 8 in each case in a row or line so that the battery 17 under no circumstances may come into contact with the fuel tank. The battery 17 is further arranged immediately adjacent to the light generator 10 and starter 11, respectively, so that the light generator cables and the starter cables 21 may be made relatively short.

While I have shown and described one embodiment in accordance with the present invention, it is to be clearly understood that the same is susceptible of numerous changes and modifications as will be apparent to one skilled in the art, and I, therefore, do not wish to be limited to the details shown and described herein but intend to cover all such changes and modifications as encompassed by the scope of the present invention.

I claim:

1. A motor vehicle, especially a passenger motor vehicle, comprising: a driven axle, a non-driven axle spaced longitudinally from said driven axle, an engine arranged adjacent the non-driven axle for driving the driven axle, engine cooling means arranged adjacent the non-driven axle for cooling the engine, transmission means arranged adjacent the driven axle for transmitting engine power to said driven axle, said transmission means including a change-speed gear and clutch means operatively associated with a differential gear, shaft means extending from said engine to said transmission means for transferring driving power from said engine to said transmission means, flywheel means connected directly to said shaft means at a position adjacent the input to said transmission means, and first and second sets of driven auxiliary devices arranged in the area of said driven axle adjacent said transmission means, said first set including a starter and a light generator, and said second set including an oil pump and a fuel pump.

2. A motor vehicle according to claim 1, characterized in that said first set is operatively driven directly by said flywheel, and in that said second set is operatively driven by an output shaft of the change-speed gear.

3. A motor vehicle according to claim 2, further comprising a set of non-driven auxiliary devices including a battery, a spare wheel, and at least one liquid container for flammable liquids such as fuel, lubricating oil and the like; said non-driven auxiliary devices being arranged laterally adjacent the sides of the transmission means.

4. A motor vehicle according to claim 3, characterized in that the at least one liquid container is arranged on one side of the transmission means, and in that the battery and its heavy current carrying wires are arranged at the side of the transmission means opposite said one side, whereby the danger of fire is reduced due to the separation of the flammable liquid from the electric current by the transmission means.

5. A motor vehicle according to claim 4, characterized in that said spare wheel is arranged on the same side of the transmission means as the battery.

6. A motor vehicle according to claim 2, characterized in that the only flywheel provided for the engine is the flywheel means connected to said shaft means at a position adjacent the input to said transmission means.

7. A motor vehicle according to claim 1, further comprising a set of non-driven auxiliary devices including a battery, a spare wheel, and at least one liquid container for flammable liquids such as fuel, lubricating oil and the like; said non-driven auxiliary devices being arranged laterally adjacent the sides of the transmission means.

8. A motor vehicle according to claim 7, characterized in that the at least one liquid container is arranged on one side of the transmission means, and in that the battery and its heavy current carrying wires are arranged at the side of the transmission means opposite said one side, whereby the danger of fire is reduced due to the separation of the flammable liquid from the electric current by the transmission means.

9. A motor vehicle according to claim 8, wherein fuel pump means and hydraulic pump means are operatively connected with the change-speed gear.

10. A motor vehicle according to claim 8, characterized in that the only flywheel provided for the engine is the flywheel means connected to said shaft means at a position adjacent the input to said transmission means.

11. A motor vehicle according to claim 8, characterized in that said spare wheel is arranged on the same side of the transmission means as the battery.

12. A motor vehicle according to claim 7, wherein the battery is arranged laterally alongside the transmission means adjacent the starter-light generator unit.

13. A motor vehicle according to claim 12, wherein the starter-light generator unit is operatively formed with the flywheel as a structural unit.

14. A motor vehicle according to claim 7, wherein basically non-flammable members are arranged between basically flammable members and heavy electrical load carrying means.

15. A motor vehicle according to claim 14, wherein the heavy electrical load carrying means include light generator and starter cables, and the basically flammable members include a fuel tank and a lube oil tank.

16. A motor vehicle according to claim 15, wherein the basically non-flammable members include the transmission means consisting of the change-speed gear, differential gear and clutch.

17. A motor vehicle according to claim 16, wherein the drive engine is a multi-cylinder, in-line engine including cooling plant means.

* * * * *